United States Patent Office.

CHRISTIAN FLAMMER, OF CHICAGO, ILLINOIS.

Letters Patent No. 100,881, dated March 15, 1870.

IMPROVED PROCESS OF MAKING GLASS SIGNS, SHOW-CARDS, &c.

The Schedule referred to in these Letters Patent and making part of the same

*To all whom it may concern:*

Be it known that I, CHRISTIAN FLAMMER, of Chicago, in the county of Cook, and State of Illinois, have invented certain Improvements in Process for making Glass Signs, Show-Cards, &c., of which the following is a specification.

My invention consists of a new and useful process of ornamenting glass, by which glass signs, show-cards, cases, and similar articles may be produced, as hereinafter explained.

I take a piece of glass of any size desired, and cover it on one side with a coat of fine copal varnish, and put it in a heated oven to dry, taking special care to allow it to dry only to that degree when it will allow nothing but printers' ink or articles of a kindred nature to adhere to it.

After the glass with its coating of varnish has been thus carefully prepared, I print the design which it is desired to ornament or represent on the glass, upon Chinese paper. When printed I wet it thoroughly, and then spread it upon the prepared glass, and roll it with a roller covered with cloth or some other suitable elastic substance, the object being to bring all the ink lines of the design or picture in contact with the varnish, and thus transfer it. When sufficiently rolled to produce this result I remove the paper, and then unite and harden the varnish and ink by thoroughly drying them, with sufficient heat for the purpose, in an oven or other suitable place.

After this is done I put on such colors as may be required to give the sign, card, case, picture, or design the appearance desired, using mother-of-pearl, tinsel, gold, silver, or other material for that purpose.

In drying the varnish, in the first instance, on the glass, it is obvious that great care should be exercised to get the proper degree of dryness, so that the very finest lines of the print may unite as firmly with the varnish as the heavier, in order that they may not dissolve on the application of the colors.

It is obvious that the pictures or designs to be transferred may be steel or copper-plate engravings, wood cuts, or lithographed pictures, and that the transfer will be more complete if made while the design or picture is fresh from the press.

The advantages of this process are that it produces a more distinct and finer picture and at less cost than by any of the ordinary processes.

Having thus described my invention,

What I claim is—

The process, substantially as herein described, of making figures on glass, for signs, show-cards, and similar purposes, as set forth.

CHRISTIAN FLAMMER.

Witnesses:
HY. H. QUAKERNACK,
WM. H. LOTZ.